United States Patent [19]

Pearce et al.

[11] Patent Number: 5,436,624
[45] Date of Patent: Jul. 25, 1995

[54] COMMUNICATION SYSTEM WITH MONITORING MEANS CONNECTED IN PARALLEL TO SIGNAL CARRYING MEDIUM

[75] Inventors: David A. J. Pearce, Buckinghamshire; Mark K. Loney, Hertfordshire, both of England

[73] Assignee: Madge Network Limited, Buckinghamshire, England

[21] Appl. No.: 6,775

[22] Filed: Jan. 21, 1993

[30] Foreign Application Priority Data

Jan. 20, 1992 [GB] United Kingdom ............... 9201126

[51] Int. Cl.[6] .................. G05B 23/02; H04J 15/00
[52] U.S. Cl. ..................... 340/825.16; 370/85.15; 370/85.12; 370/16.1; 371/8.1
[58] Field of Search ............... 340/825.05, 825.12, 340/825.16; 370/16.1, 85.12, 85.15; 371/7, 8.1–8.2, 9.1, 10.1–10.3, 11.1–11.3, 12–14

[56] References Cited

U.S. PATENT DOCUMENTS

| | | | |
|---|---|---|---|
| 3,978,451 | 8/1976 | Ito et al. | 340/825.05 |
| 4,159,470 | 6/1979 | Strojny et al. | 340/825.05 |
| 4,241,330 | 12/1980 | Hery et al. | 340/825.05 |
| 4,435,704 | 3/1984 | Hashimoto et al. | 371/8.2 |
| 4,503,535 | 3/1985 | Budde et al. | 371/11.3 |
| 4,709,365 | 11/1987 | Beale et al. | 371/11.2 |
| 5,081,452 | 1/1992 | Cozic | 340/825.05 |
| 5,155,480 | 10/1992 | Pfeiffer | 340/825.12 |
| 5,353,286 | 10/1994 | Patrick et al. | 370/85.15 |

*Primary Examiner*—Donald J. Yusko
*Assistant Examiner*—David Jung
*Attorney, Agent, or Firm*—Sughrue, Mion, Zinn, Macpeak & Seas

[57] ABSTRACT

A communication system comprises a signal carrying medium (8) coupled to a series of end station ports (2–5). The end station ports (2–5) enable respective end stations (21) to transmit signals onto and receive signals from the medium (8). A controller (7) is provided to control the connection of the end stations (21) to the medium (8) via the ports (2–5). Monitors (9–12) are connected to the controller (7) to monitor characteristics of signals generated by the end stations (21) coupled to the ports. The monitors (9–12) are connected in parallel to the medium (8) and supply information relating to the monitored signals to the controller (7) in use. This system allows faulty end stations to be identified and removed from the system.

9 Claims, 2 Drawing Sheets

COMMUNICATION SYSTEM WITH MONITORING MEANS CONNECTED IN PARALLEL TO SIGNAL CARRYING MEDIUM

FIELD OF THE INVENTION

The invention relates to a communication system, for example a ring communication system or a bus based system, having a number of end station ports which enable respective end stations (such as computers and word processing terminals) to transmit onto and receive signals from a signal carrying medium.

DESCRIPTION OF THE PRIOR ART

Communication systems of this type are highly sophisticated and rely on complex protocols to enable communication to be achieved between end stations connected to the signal carrying medium. Examples of such protocols are the token ring protocol and the FDDI system. These protocols incorporate certain fault recovery procedures if a fault should arise within the system. However, with increasing numbers of end stations being connected to communication systems, the existing fault recovery techniques tend to be slow and in addition the existing fault recovery procedures provide incomplete protection against the erroneous operation of the end stations themselves, nor against any out of specification operation of the system.

Conventionally, ports are grouped into so-called hub units which themselves can incorporate certain intelligence to enable faults to be detected. For example, in one type of hub unit, additional stations are incorporated on the system within the hub which are used simply to detect if the network or system is operational or faulty. Internal control circuits can then process the information returned by these additional stations and force other end stations connected to the hub to be removed in turn until the network or system is again operational.

As mentioned above, these fault recovery techniques are slow particularly in practical implementations where more than 80 end stations may be connected to a single hub. Multiple faults will further increase fault recovery time.

SUMMARY OF THE INVENTION

In accordance with the present invention, a communication system comprises a signal carrying medium coupled to a series of end station ports which enable respective end stations to transmit signals onto and receive signals from the medium; control means for controlling the connection of end stations to the medium via the ports; and monitoring means connected to the control means for monitoring characteristics of signals generated by end stations coupled to the ports, the monitoring means being connected in parallel to the medium and supplying information relating to the monitored signals to the control means in use.

In contrast to the known systems described above, in which fault recovery is achieved by placing additional end stations onto the medium, the invention provides monitoring means in parallel with the medium to monitor the signals generated by the end stations, those signals passing in parallel to the monitoring means and along the signal carrying medium.

There are several ways in which the invention can be implemented. In one arrangement, the monitoring means comprises a number of monitoring units, one connected to each port. This enables the signals from each end station to be monitored individually and separately so that a fault condition can immediately be isolated to a particular end station and remedial action taken.

Preferably, each monitoring unit is positioned between the end station and the port so that signals from the end station are monitored before they reach the port. This is particularly convenient in that it enables the characteristics of an end station to be monitored before the port is controlled by the control means to allow signals from the end station to reach the signal carrying medium. Thus, if any fault is detected, the end station will not be connected to the signal carrying medium and so operation of the communication system will not be jeopardised.

It should be understood that although the invention is primarily to prevent fault conditions preventing operation of the communication system, it also enables signals from the end stations to be monitored and reported for other reasons.

In a simple case, each monitoring unit will simply pass to the control means a signal indicating the value of the monitored characteristic. For example, the unit may include a threshold detector and pass a signal indicating whether or not the particular characteristic exceeds the threshold. Typically, each unit will enable more than one characteristic to be monitored and generate appropriate signals to the control means.

A further advantage of the invention is that each end station can be characterised by its particular characteristics so that if the end station is moved, substituted, or tampered with these values may exhibit a sudden change which can be used to alert the control means or network administrator.

In a second arrangement, a number of monitoring units may be provided, each associated with a group of ports. In this case, each monitoring unit will be connected to each of its associated ports in turn and will report signal characteristic conditions to the control means. Apart from the addition of a switch, this unit will be similar to the unit described above. A further advantage of this approach is that characteristics of the end stations which require more complex circuitry can be monitored since that circuitry will be common to a group of ports. Typical characteristics or parameters which could be monitored are those which are specified in the IEEE Standard 802.5-1989 for token ring operation. These include:

Signal level: Average Differential
Data Rate
Pattern Jitter
Eye height
Eye width
Signal spectrum Pattern jitter, eye height, eye width and signal spectrum require a significant amount of circuitry but could be monitored with the more complex monitoring unit described above which can be connected to more than one port.

Pattern jitter is the portion of the total jitter that is related to the data pattern. The maximum pattern jitter occurs for a worst-case data pattern, usually a data stream that switches between all zeros and all ones. Measurements of worst-case pattern jitter are made with zero transferred jitter and an input data stream consisting of alternating strings of ones and zeros to allow measurement of transient phase effects. The output phase is specified both raw (unfiltered), to limit the data/clock alignment error in the following station, and filtered, to limit the total accumulated jitter of the ring. The IEEE Standard also provides a receive signal eye pattern which includes a minimum eye height requirement and corresponding eye width and the conditions for measuring these parameters.

The examples described above could be used with communication systems in the form of a ring or which are bus based. A further arrangement arises, in the case of a ring communication system. In this case the monitoring means may comprise a single monitoring unit associated with a group of ports and positioned downstream of the ports, the control means being adapted to exclude from the communication system all but one end station in turn, the monitoring means reporting characteristic signals transmitted on the signal carrying medium to the control means. This arrangement is most conveniently realised where the ports are grouped together in a hub, the monitoring means and control means being positioned within the hub.

BRIEF DESCRIPTION OF THE DRAWINGS

An example of a token ring communication system according to the invention will now be described with reference to the accompanying drawings, in which.

EMBODIMENT

Figure 1:
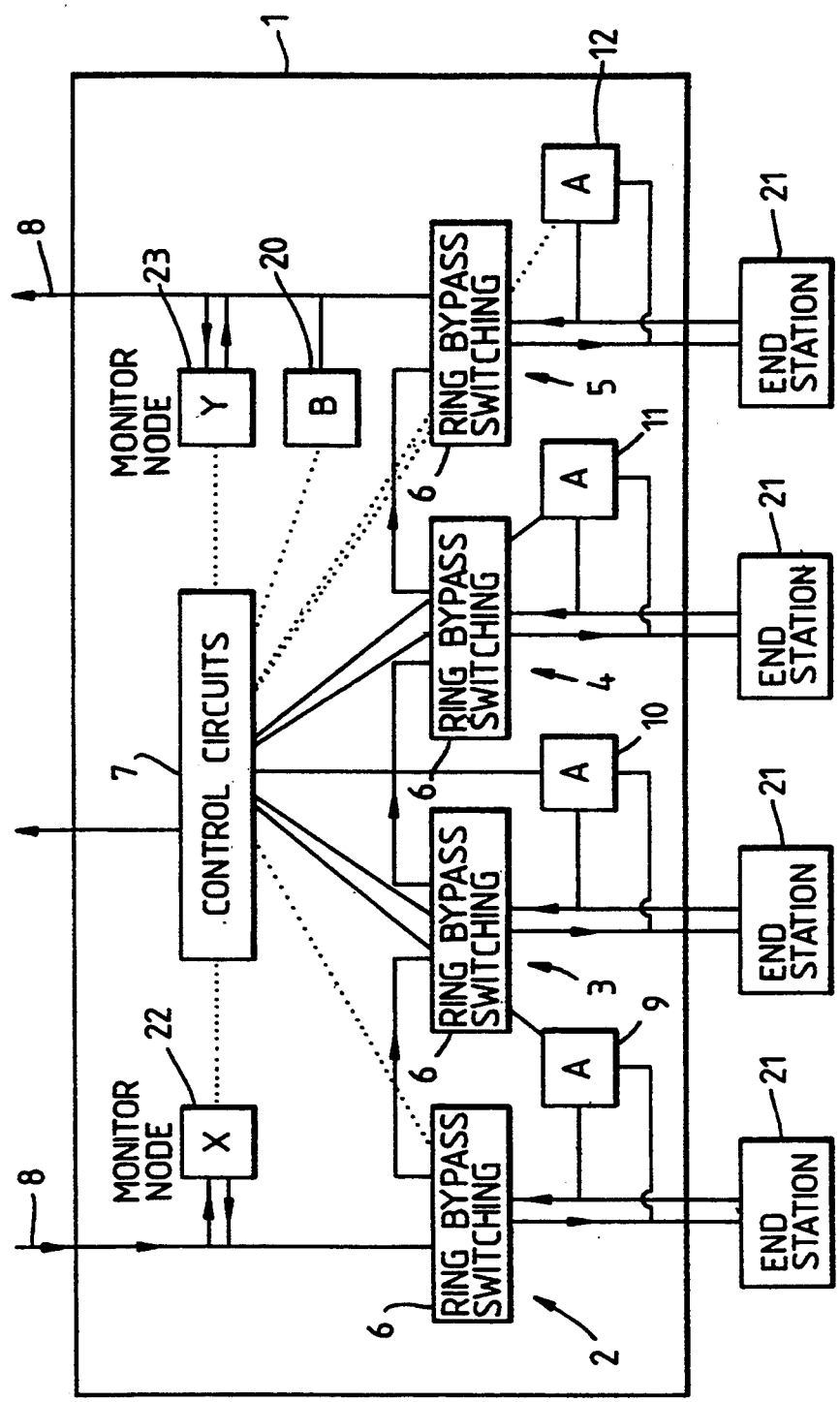
FIG. 1 illustrates in block diagram form a hub or concentrator forming part of the system including a known arrangement; and, FIG. 2 is a block diagram illustrating one of the monitoring units shown in FIG. 1, in more detail.

FIG. 1 illustrates a concentrator 1 having a number of ports 2, 5 each of which comprises a ring bypass switch 6 controlled by a control circuit 7 which may be optionally connected to a management station (not shown) for reporting and control. Each bypass switch 6 can be controlled either to pass received signals directly from an input port to an output port or to an end station coupled to the switch. Typically, there may be up to 80 or more ports in a concentrator but for simplicity only four are shown in FIG. 1.

The concentrator 1 is connected to the remainder of the network via a uni-directional communication medium 8 such as copper wire or optical fibre. Whenever an end station forms part of the ring communication system, the ring includes the end stations so that data or signals pass through the appropriate ring bypass switch 6 through the end station, back to the bypass switch 6 and then on to the next bypass switch 6.

FIG. 1 illustrates one implementation of a ring concentrator which has been used in the past to enable certain faults to be detected. In these known concentrators, a pair of stations X, Y 22,23 are inserted into the ring so that the data passes into the concentrator, through the station X 22, and then through the first bypass switch 6, while from the last bypass switch 6, data passes through the station Y 23 and then out of the concentrator. For the reasons explained above, the use of stations X, Y 22,23 leads to certain limitations.

In the embodiment of the invention shown in FIG. 1, these problems are overcome by inserting monitor units A 9–12, one associated with each of the ports 2-5 respectively. The stations X, Y 22,23 could remain (as shown) or be omitted. As can be seen in FIG. 1, each monitor unit A 9–12 taps off the signals passing to and from the end stations at positions between the port and the end station and supplies information signals to the control circuit 7. The connections to the lines between the ports and the end stations may be simple taps for copper wire or optical fibres but alternatively optical fibres from the end stations may be connected to suitable converters at or outside the concentrator 1 which convert from optical to electrical media and vice versa.

Figure 2:
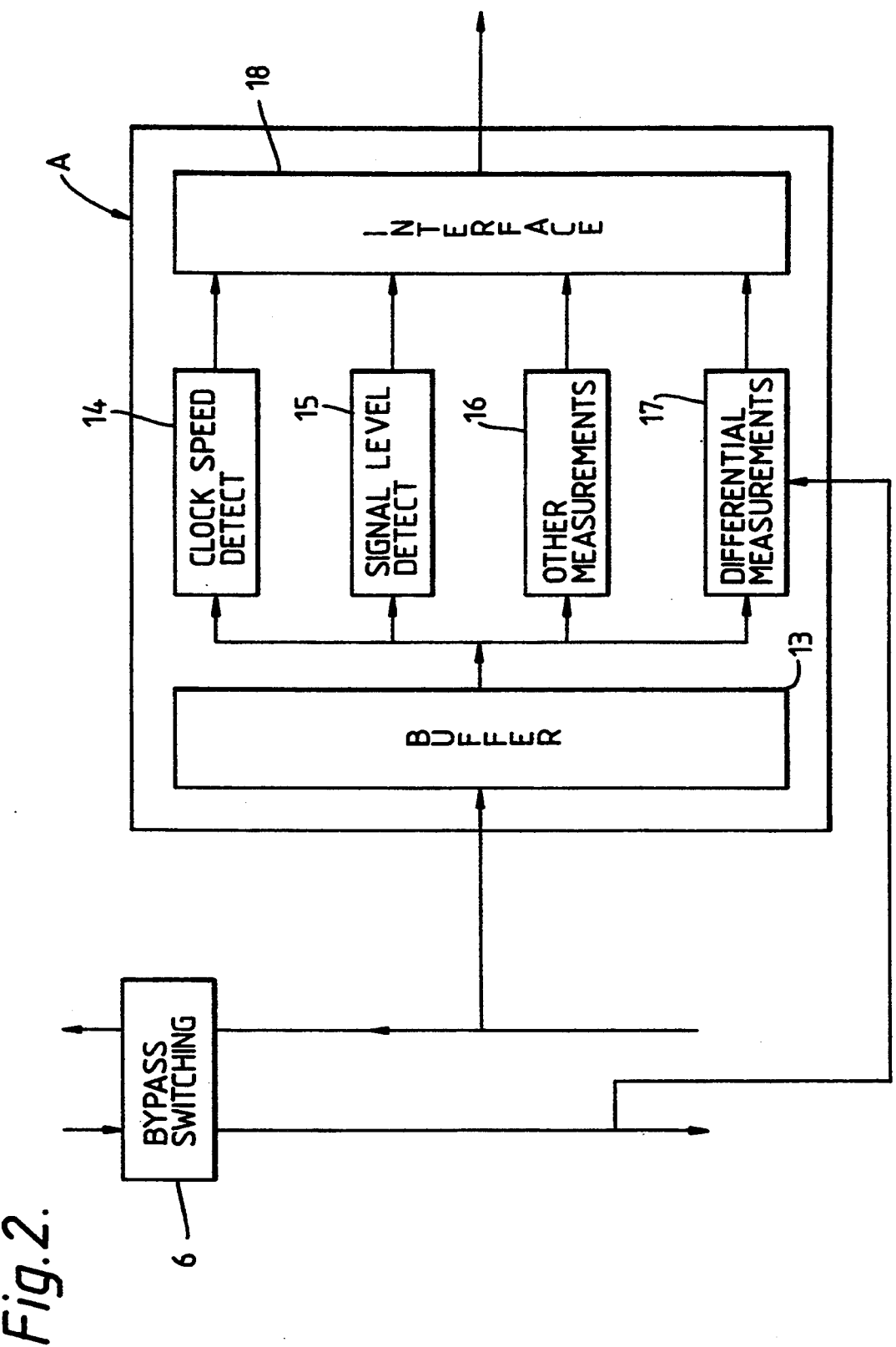

An example of a monitor unit A 9–12 is shown in FIG. 2. The unit comprises a buffer 13 to which a copy of the signals passing from the end station to the port is passed. The buffer is optional and is only required if the measurement equipment could corrupt the signal itself. The signal is then copied to each of four detection circuits 14–17 which monitor certain characteristics of the signal and pass appropriate condition indicating signals via an interface 18 to the control circuit 7. For example, in this implementation, a clock speed detect circuit 14 is provided in the form of a frequency counter which will generate a signal representative of the clock speed of data generated by the end station, typically four or sixteen MBit/sec. The circuit 15 monitors the signal level while the circuit 16 monitors other characteristics of the signals as mentioned above. The circuit 17 monitors characteristics such as jitter introduced by the end station and thus requires as input both signals input to the end station and those output from the end station.

Each of the circuits 14–17 generates a signal indicating the result of the monitoring process, for example a signal level value or a digital yes/no value indicating whether or not a threshold has been exceeded, those signals then being passed via the interface 18 to the control circuit 7. If the signals indicate that a fault condition exists then the control circuit 7 operates to close the appropriate bypass switch 6 so that the corresponding end station is isolated from the ring. Typical faults include incorrect end station configuration (incorrect speed setting), poor connections, over length cables and the like. Furthermore, if the signal characteristics of each end station is known together with the channel characteristics, an approximation could be made as to network cable lengths.

In a modified arrangement, the number of monitor units A 9–12 could be reduced within the concentrator 1. For example, in the case of the concentrator shown in FIG. 1, the monitor units 9–11 could be omitted and the monitor unit 12 connected to the connection points of the monitor units 9–12 in parallel. In that case, the unit shown in FIG. 2 will be modified to include a switch upstream of the buffer 13 so that signals from each of the end stations in turn could be passed to the detect circuits 14–17. Alternatively, a separate buffer will be provided for the signals from each end station, the buffers being connected to a switch whose outlet feeds to the circuits 14–17. As mentioned above, this has the advantage that more complex circuitry could be used in the monitor unit without significantly increasing overall costs.

In a further modification shown in FIG. 1, the monitor units A 9–12 could be replaced by a single monitor unit B 20 whose internal configuration is similar to that shown in FIG. 2. In this case, the monitor unit 20 works in conjunction with the control circuit 7 during a monitoring mode in which all but one of the end stations is switched out by the control circuit 7 so that only signals from one end station are monitored by the monitor unit 20.

The end station switched out is changed in series so that all the end stations are monitored.

We claim:

1. A local area network communication system, the system comprising a signal carrying medium coupled to a series of end station ports which enable respective end stations to transmit signals onto and receive signals from said signal carrying medium; control means for controlling the connection of end stations to said signal carrying medium via said end station ports; and monitoring means connected to said control means for monitoring characteristics of signals generated by end stations coupled to said end station ports, said monitoring means being connected in parallel to said signal carrying medium between said end stations and said end station ports as to enable monitoring of signals from one of said end stations before they reach the respective end station port, said monitoring means supplying information relating to the monitored signals to said control means in use.

2. A communication system according to claim 1, wherein said monitoring means comprises a number of monitoring units, one connected to each port.

3. A communication system according to claim 2, wherein each monitoring unit is positioned between each end station and a respective end station port so that signals from each end station are monitored before they reach the respective end station port.

4. A communication system according to claim 2, wherein each monitoring unit enables more than one characteristic to be monitored and generates appropriate signals to said control means.

5. A communication system according to claim 1, wherein monitoring means comprises a number of monitoring units, each associated with a group of ports.

6. A communication system according to claim 5, wherein each monitoring unit is connected to each of its associated ports in turn and reports signal characteristic conditions to said control means.

7. A communication system according to claim 1, wherein the characteristics or parameters to be monitored include at least one of:

Average signal level;
Differential signal level,
Data Rate,
Pattern Jitter,
Eye height,
Eye width, and
Signal spectrum.

8. A communication system according to claim 1, the system comprising a ring communication system.

9. A system according to claim 8, wherein the monitoring means comprises a single monitoring unit associated with a group of ports and positioned downstream of said group of ports, and wherein said control means are adapted to exclude from the communication system all but one end station in turn, said monitoring means reporting characteristic signals transmitted on the signal carrying medium to said control means.

* * * * *